US010294572B2

(12) United States Patent
Hahn et al.

(10) Patent No.: US 10,294,572 B2
(45) Date of Patent: May 21, 2019

(54) GAS DIFFUSION LAYER, ELECTROCHEMICAL CELL HAVING SUCH A GAS DIFFUSION LAYER, AND ELECTROLYZER

(71) Applicant: SIEMENS AKTIENGESELLSCHAFT, München (DE)

(72) Inventors: Alexander Hahn, Röttenbach (DE); Alexander Spies, Erlangen (DE); Jochen Straub, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 50 days.

(21) Appl. No.: 15/319,249

(22) PCT Filed: Jun. 15, 2015

(86) PCT No.: PCT/EP2015/063262
§ 371 (c)(1),
(2) Date: Dec. 15, 2016

(87) PCT Pub. No.: WO2015/193211
PCT Pub. Date: Dec. 23, 2015

(65) Prior Publication Data

US 2017/0191175 A1 Jul. 6, 2017

(30) Foreign Application Priority Data

Jun. 16, 2014 (EP) .................................... 14172465

(51) Int. Cl.

| | |
|---|---|
| ***H01M 4/88*** | (2006.01) |
| ***C25B 11/03*** | (2006.01) |
| ***C25B 9/10*** | (2006.01) |
| ***C25B 9/20*** | (2006.01) |
| ***C25B 1/10*** | (2006.01) |

(52) U.S. Cl.
CPC ............. *C25B 11/035* (2013.01); *C25B 1/10* (2013.01); *C25B 9/10* (2013.01); *C25B 9/203* (2013.01); *H01M 4/8807* (2013.01); *Y02E 60/366* (2013.01)

(58) Field of Classification Search
None
See application file for complete search history.

(56) References Cited

U.S. PATENT DOCUMENTS

| | | | |
|---|---|---|---|
| 4,639,303 | A | 1/1987 | Staab et al. |
| 5,460,705 | A | 10/1995 | Murphy et al. |
| 6,312,572 | B1 | 11/2001 | Katayama |
| 2003/0188966 | A1 | 10/2003 | Katayama |
| 2007/0020505 | A1 | 1/2007 | Grafl et al. |

(Continued)

FOREIGN PATENT DOCUMENTS

| | | | |
|---|---|---|---|
| CN | 1564878 | A | 1/2005 |
| DE | 10027339 | A1 | 12/2001 |
| DE | 20308332 | U1 | 2/2004 |

(Continued)

*Primary Examiner* — Wyatt P McConnell
(74) *Attorney, Agent, or Firm* — Henry M. Feiereisen LLC

(57) ABSTRACT

A gas diffusion layer is arranged between a bipolar plate and an electrode of an electrochemical cell and includes at least two layers which are layered one on top of the other layer. At least one of the two layers is designed as a spring component having a progressive spring characteristic curve.

17 Claims, 4 Drawing Sheets

(56) References Cited

U.S. PATENT DOCUMENTS

| | | | |
|---|---|---|---|
| 2009/0098432 | A1 | 4/2009 | Rosenberg |

FOREIGN PATENT DOCUMENTS

| | | | |
|---|---|---|---|
| DE | 102004023161 | A1 | 11/2005 |
| EP | 1378589 | B1 | 12/2005 |
| EP | 2436804 | A1 | 4/2012 |
| JP | H0762582 | A | 3/1995 |
| JP | 3041786 | B1 | 5/2000 |
| JP | 2004002993 | | 1/2004 |
| JP | 2004244676 | A | 9/2004 |
| JP | 2009526347 | A | 7/2009 |
| KR | 1020030079788 | A | 5/2005 |
| SU | 1461040 | A1 | 3/1995 |
| WO | WO 0235620 | A2 | 5/2002 |
| WO | WO 2004036677 | A2 | 4/2004 |
| WO | WO 2007080193 | A2 | 7/2007 |
| WO | WO2013137470 | A1 | 9/2013 |

GAS DIFFUSION LAYER, ELECTROCHEMICAL CELL HAVING SUCH A GAS DIFFUSION LAYER, AND ELECTROLYZER

CROSS-REFERENCES TO RELATED APPLICATIONS

This application is the U.S. National Stage of International Application No. PCT/EP2015/063262, filed Jun. 15, 2015, which designated the United States and has been published as International Publication No. WO 2015/193211 A1 which claims the priority of European Patent Application, Serial No. 14172465.8, filed Jun. 16, 2014, pursuant to 35 U.S.C. 119(a)-(d).

BACKGROUND OF THE INVENTION

The invention relates to a gas diffusion layer for an electrochemical cell, in particular for a PEM electrolysis cell. The invention furthermore relates to an electrochemical cell, in particular a PEM electrolysis cell or galvanic cell having such a gas diffusion layer, and also to an electrolyzer.

Electrochemical cells are generally known and are split into galvanic cells and electrolysis cells. An electrolysis cell is an apparatus in which an electric current causes a chemical reaction, with at least some electrical energy being converted into chemical energy. A galvanic cell is an apparatus complementary to the electrolysis cell for spontaneously converting chemical energy into electrical energy. A known apparatus of such a galvanic cell is a fuel cell, for example.

The cleavage of water by electric current for the production of hydrogen gas and oxygen gas by means of an electrolysis cell is well-known. A distinction is made here primarily between two technical systems, alkaline electrolysis and PEM (Proton-Exchange-Membrane) electrolysis.

The core of a technical electrolysis plant is the electrolysis cell, comprising two electrodes and an electrolyte. In a PEM electrolysis cell, the electrolyte consists of a proton-conducting membrane, on both sides of which are located the electrodes. The assembly consisting of membrane and electrodes is referred to as MEA (Membrane-Electrode-Assembly). In the assembled state of an electrolysis stack composed of a plurality of electrolysis cells, the electrodes are contacted by what are termed bipolar plates via a gas diffusion layer, the bipolar plates separating the individual electrolysis cells of the stack from one another. In this case, the $O_2$ side of the electrolysis cell corresponds to the positive terminal and the $H_2$ side corresponds to the negative terminal, separated by the intermediate membrane-electrode-assembly.

The PEM electrolysis cell is fed on the $O_2$ side with fully desalinated water, which is decomposed at the anode into oxygen gas and protons ($H^+$). The protons migrate through the electrolyte membrane and recombine at the cathode ($H_2$ side) to form hydrogen gas. In addition to the electrode contacting, the gas diffusion layer resting on the electrodes ensures an optimum water distribution (and therefore the wetting of the membrane) and also the removal of the product gases. What is therefore required as a gas diffusion layer is an electrically conductive, porous element with good permanent contacting of the electrode. As an additional requirement, dimensional tolerances which possibly arise in the electrolyzer should be compensated for in order to allow for uniform contacting of the MEA in every instance of tolerance.

To date, sintered metal disks have generally been used as the gas diffusion layer. Although these satisfy the requirements in respect of electrical conductivity and porosity, an additional tolerance compensation of the components of the electrolysis cell on both sides of the gas diffusion layer is not possible. Moreover, the manufacturing costs for such disks are comparatively high and there is a restriction with respect to the size owing to the pressing forces required during the manufacture of such disks. In addition, problems in relation to warping which can only be controlled with difficulty arise in the case of large components.

The use of gas diffusion electrodes with resilient elements for producing an electrical contact in the case of alkaline electrolyzers is described, for example, in WO 2007/080193 A2 and EP 2436804 A1.

EP 1378589 B1 discloses a spring sheet, in which the individual spring elements are bent alternately upward and downward. The spring sheet is incorporated in an ion exchange electrolyzer merely on the cathode side, such that the spring sheet contacts the cathodes directly.

US 2003/188966 A1 describes a further spring component for an electrolysis cell, which is arranged between a partition wall and a cathode. The spring component comprises a multiplicity of leaf spring elements, which rest on the cathode for uniform adaptation.

Further gas diffusion electrodes of differing construction are described in WO 2002035620 A2, DE 10027339 A1 and DE 102004023161 A1.

SUMMARY OF THE INVENTION

The invention is based on the object of compensating for possible component tolerances in an electrochemical cell, in particular in an electrolysis cell or galvanic cell, in particular in the region of the bipolar plates.

According to the invention, the object is achieved by a gas diffusion layer to be arranged between a bipolar plate and an electrode of an electrochemical cell, comprising at least two layers layered one on top of another, wherein one of the layers is in the form of a spring component having a progressive spring characteristic curve.

According to the invention, the object is furthermore achieved by an electrochemical cell, in particular by a PEM electrolysis cell, having such a gas diffusion layer.

According to the invention, the object is furthermore achieved by an electrolyzer having such a PEM electrolysis cell.

The advantages and preferred embodiments mentioned hereinbelow in relation to the gas diffusion layer can be transferred analogously to the electrochemical cell, the galvanic cell, in particular fuel cell, the PEM electrolysis cell and/or the electrolyzer.

The invention is based on the knowledge that a progressive spring behavior ensures that the contact pressure is sufficient in all tolerance positions of the contiguous components. The implementation of a progressive spring behavior in a gas diffusion layer is effected in this respect by the geometry of the spring component.

A spring component is understood to mean a layer of the gas diffusion layer which has an elastically restoring behavior, i.e. yields under loading and returns to the original shape after relief.

A spring characteristic curve shows the force-travel curve of a spring, i.e. the spring characteristic curve makes a statement in the form of a graph in relation to how efficient the force-travel relationship of a spring is. A progressive spring characteristic curve has the property of showing ever smaller steps on the spring travel with uniform loading steps. In the case of the progressive characteristic curve, the effort exerted increases in relation to the travel covered. As alternatives thereto, there are the linear spring characteristic curve and the degressive spring characteristic curve.

In a possible exemplary embodiment, the gas diffusion layer of the electrochemical cell comprises at least three layers, therefore inner and outer layers. It has proved to be particularly advantageous if the spring component forms an outer layer of the gas diffusion layer.

An "outer layer" is provided to rest against a component adjoining the gas diffusion layer.

In this context an "outer layer" is understood to mean that, in the case of more than two layers, an outer layer which in particular directly adjoins the bipolar plate is in the form of a spring component having a progressive spring characteristic curve.

The use of a spring component having a progressive spring characteristic curve as a gas diffusion layer has the significant advantages that large deformations of the spring component are achieved in the range of the normal contact pressure (approximately 5-25 bar), and therefore high component tolerances are compensated for; in the case of overloading, the additional spring travel is in turn small, and therefore the spring component withstands high pressures. In the case of a load significantly above the operating contact pressure, excessive plastic deformation of the spring component is therefore prevented.

The spring system serves firstly for producing the electrical contacting between the MEA and the bipolar plate, which is already ensured in the case of a small contact pressure. Secondly, the contact pressure ensures uniform and areal contacting with the MEA. Depending on the structural specification, the inflowing water is pre-distributed by the spring component. Furthermore, the flow of electric current is determined via the spring component.

It is preferable that the at least two layers layered one on top of another differ from one another in terms of their structure and/or composition. This is brought about in particular by the functionality of the layers. In the case of a two-layer structure of the gas diffusion layer, one layer lies on the bipolar plate and the other lies on an electrode. The properties and therefore the construction or composition of both layers are correspondingly different. The same applies if one or more intermediate layers are present between the two outer layers.

The gas diffusion layer advantageously comprises three layers: a contacting component, a diffusion component and the spring component. The inner contacting component serves for uniform contacting of the gas diffusion layer on the electrode. The use of fine materials such as, e.g., nonwoven material or very finely perforated metal sheet is therefore recommended. The central diffusion component serves to remove gas which forms, with the entire flow of electric current also passing said component. As already explained, the outer spring component ensures first and foremost the most stable contact pressure possible, irrespective of the tolerance position of the adjoining components.

With a view to a particularly high degree of flexibility of the spring component, which satisfies the requirements during use with respect to the tolerance compensation, the spring component is configured in such a manner that the spring characteristic curve can be divided into at least two, in particular three, regions of differing progression. In this case, the spring component is characterized by a maximum elastic deformation in the region of the greatest contact pressure. In this case, maximum elastic deformation is understood to mean the boundary between an elastic and purely plastic behavior of the spring component. A part-elastic and part-plastic behavior of the spring component likewise falls under the maximum elastic deformation here. In particular, the maximum elastic deformation travel of the spring component is achieved at a contact pressure of approximately 50 bar. At above approximately 50 bar, the spring has a purely plastic behavior, i.e. the deformation at this loading and above is irreversible.

With a view to a rapid compensation of component tolerances, the spring component is preferably configured in such a manner that, with a contact pressure of up to 5 bar, there is deformation of the spring component amounting to up to 60%, in particular up to 80%, with respect to the maximum elastic deformation.

Moreover, the spring component is preferably configured in such a manner that, with a contact pressure of between 5 bar and 25 bar, there is deformation of the spring component (12*a*, 12*b*, 12*c*) amounting to between 60% and 90% with respect to a maximum elastic deformation.

The spring component is expediently formed from an electrically conductive material, in particular from high-grade steel, titanium, niobium, tantalum and/or nickel. Such a composition of the spring component allows it to be used in particular as a power distributor.

According to a first preferred embodiment, the spring component is formed in the manner of a profiled metal sheet. Such an embodiment is distinguished by a comparatively easy production.

According to an alternative preferred embodiment, the spring component is formed in the manner of a mesh. In this case, the spring properties can easily be varied by the manner and density of the mesh.

The spring component preferably comprises one or more spirals. The spring properties are defined in this case by the design and arrangement of the spirals.

BRIEF DESCRIPTION OF THE DRAWING

Exemplary embodiments of the invention can be explained with reference to a drawing, in which.

Identical reference signs have the same meaning in the various figures.

DETAILED DESCRIPTION OF THE EMBODIMENTS

Figure 1:
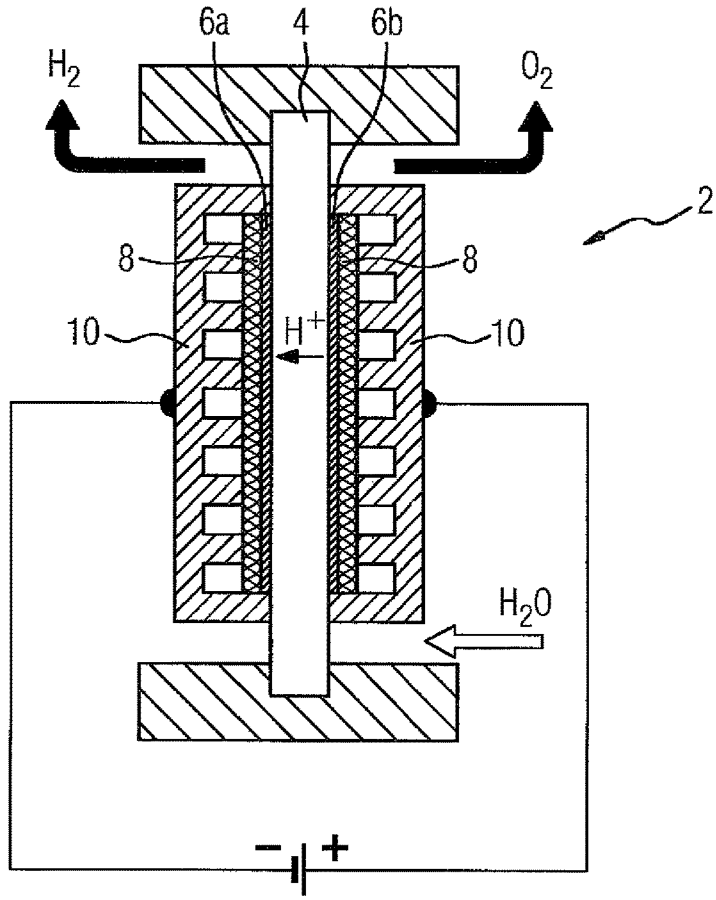
FIG. 1 shows the basic structure of an electrochemical cell, which is configured by way of example as a PEM electrolysis cell.

FIG. 1 schematically shows the structure of an electrochemical cell 2, which is in the form of a PEM electrolysis cell. The electrochemical cell 2 is part of an electrolyzer (not shown in more detail here) for the cleavage of water by electric current for the production of hydrogen and oxygen.

The electrochemical cell 2 comprises an electrolyte consisting of a proton-conducting membrane 4 (Proton-Exchange-Membrane, PEM), on both sides of which are located the electrodes 6*a*, 6*b*. The assembly consisting of membrane and electrodes is referred to as a membrane-electrode-assembly (MEA). 6*a* in this respect denotes a cathode, and 6*b* denotes an anode. A gas diffusion layer 8 rests in each case on the electrodes 6*a*, 6*b*. The gas diffusion layers 8 are contacted by what are termed bipolar plates 10, which in the assembled state of an electrolysis stack separate a plurality of individual electrolysis cells 2 from one another.

The electrochemical cell 2 is fed with water, which is decomposed at the anode 6*b* into oxygen gas $O_2$ and protons $H^+$. The protons $H^+$ migrate through the electrolyte membrane 4 in the direction of the cathode 6*a*. On the cathode side, they recombine to form hydrogen gas $H_2$.

In another exemplary embodiment, the electrochemical cell 2 is designed as a galvanic cell, or fuel cell, formed for generating electricity. According to the invention, the gas diffusion layers 8 of electrochemical cells 2 formed in this manner are to be modified in a manner analogous to the electrolysis cell shown in FIG. 1. Without limiting generality, reference is therefore made hereinbelow, by way of example, to an electrochemical cell 2 formed as an electrolysis cell.

The gas diffusion layer 8 ensures an optimum distribution of the water and also removal of the product gases. In the case of a galvanic cell, the gas diffusion layers 8 accordingly serve for feeding reactants to the respective electrodes. It is essential in this respect that the gas diffusion layer 8 is permeable to the gaseous products or reactants in any case.

The gas diffusion layer 8 moreover serves as a power distributor, particularly in the case of an electrolysis cell. For these reasons, the gas diffusion layer 8 is formed from an electrically conductive, porous material.

In the exemplary embodiment shown, component tolerances, in particular those of the contiguous bipolar plates 10, are compensated for by the gas diffusion layer 8. Therefore, the gas diffusion layer 8 contains layers layered one on top of another, with an outer layer being in the form of a spring component 12*a*, 12*b*, 12*c* (see FIGS. 3 to 9) having a progressive spring characteristic curve. The gas diffusion layer 8 comprises, in particular, a shown contacting component, a diffusion component and the spring component, which differ from one another in terms of their structure and/or composition.

Figure 2:
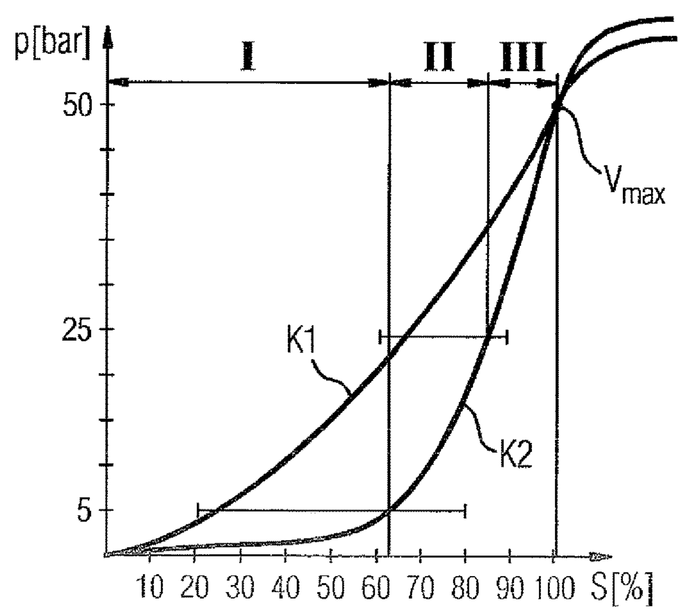
FIG. 2 shows progressive spring characteristic curves.

FIG. 2 shows two exemplary progressive spring characteristic curves K1 and K2. On the x axis, S denotes the spring travel, and on the y axis F denotes the spring force. As is apparent from FIG. 2, the spring characteristic curves are divided into three regions. A maximum elastic deformation $V_{max}$, which is at approximately 50 bar in the exemplary embodiment shown, represents the point of transition between the elastic progression and the plastic progression of the spring characteristic curve, or between the elastic behavior and the plastic behavior of the spring. To the right of the maximum elastic deformation $V_{max}$ (corresponds to 100%), the spring undergoes purely plastic deformation.

In a first region I, the spring component undergoes a relatively high degree of deformation at a relatively low contact pressure of up to 5 bar; in particular, a deformation of the spring characteristic curve K1 lies between 20% and 30% and a deformation of the spring characteristic curve K2 even lies at up to above 60%.

In a second region II, at a contact pressure of between 5 bar and 25 bar, the deformation of the spring component lies between approximately 60% and approximately 90% with respect to the maximum elastic deformation $V_{max}$.

The spring component is moreover configured in such a manner that only a small degree of deformation takes place at a contact pressure of above 25 bar, such that the part of the standardized spring travel S is covered between 60% and 100% for K1 and between approximately 85% and 100% for K2.

Figure 3:
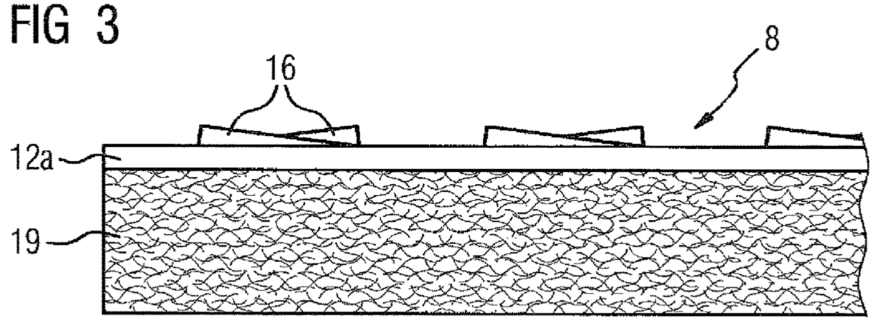
FIG. 3 shows a side view of a first embodiment of a spring component of a gas diffusion layer.
Figure 4:
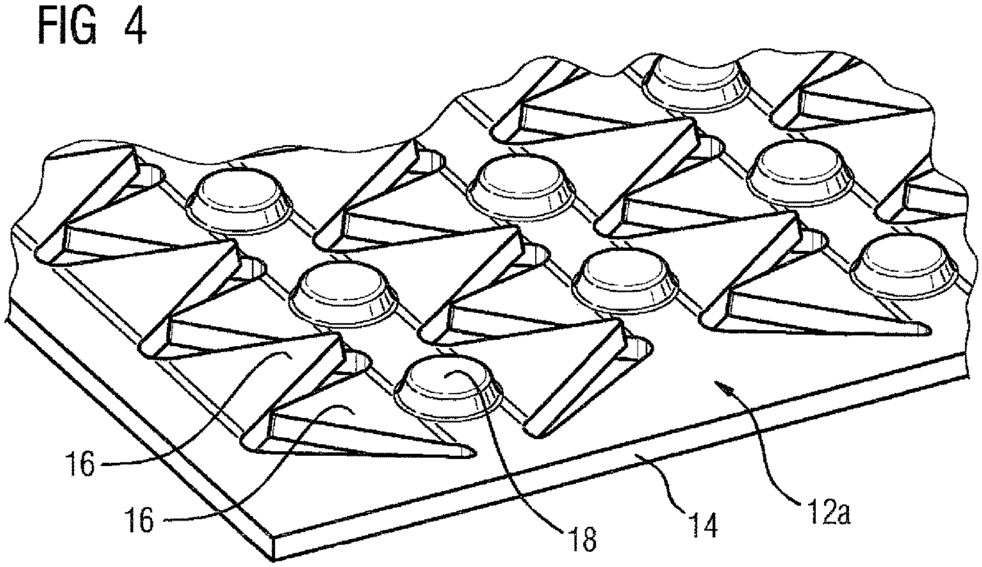
FIG. 4 shows a plan view of the first embodiment of a spring component of a gas diffusion layer.

FIG. 3 and FIG. 4 show a first exemplary embodiment of a gas diffusion layer 8 having a spring component 12*a*. This comprises a metal sheet 14 with bent triangles 16, which are cut out at the surface and provide the metal sheet 14 with its resilient behavior. The spring behavior of a spring component 12*a* of this type is progressive, but has to be limited mechanically in order to avoid excessive plastic deformation of the metal sheet 14. In this case, this is done by spacers 18 impressed between the triangles 16. The spacers 18 are considerably more rigid than the upwardly bent triangles 16, and therefore the spring characteristic curve of the spring component 12*a* rises greatly as soon as the spacers 18 are moved into contact with the adjoining bipolar plate 10. As is apparent from FIG. 3, the gas diffusion layer 8 moreover comprises a contacting component 19, which is formed from a non-woven material and rests in the assembled state on an electrode 6*a*, 6*b*.

Figure 5:
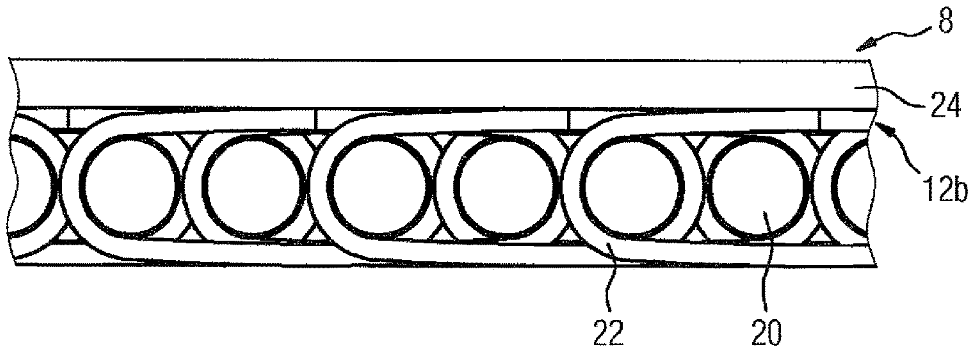
FIG. 5 shows a side view of a second embodiment of a spring component of a gas diffusion layer.
Figure 6:
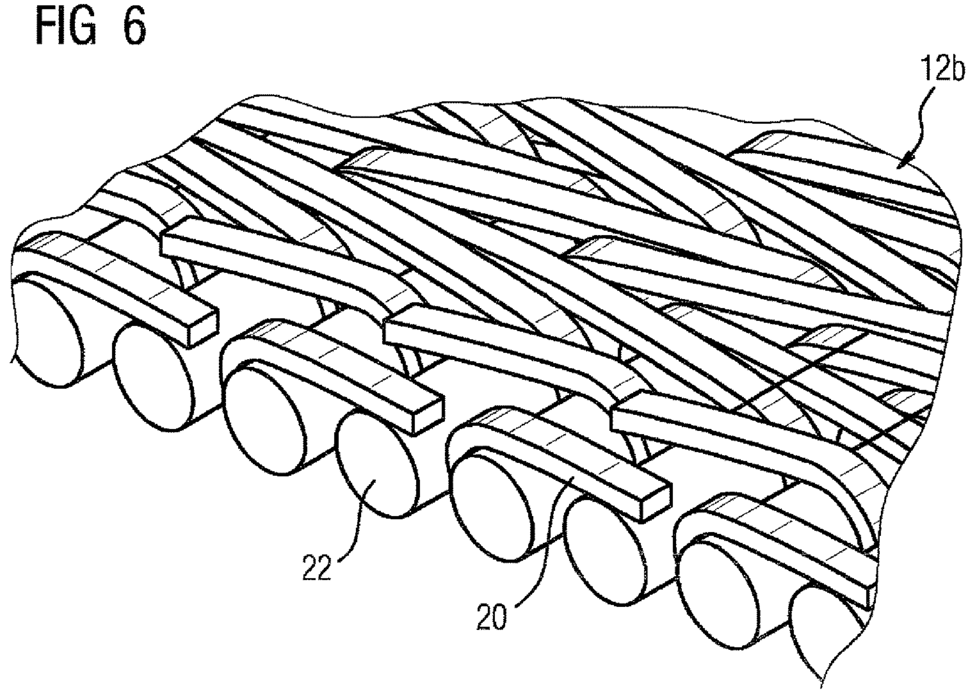
FIG. 6 shows a plan view of the second embodiment of a spring component of a gas diffusion layer.
Figure 7:
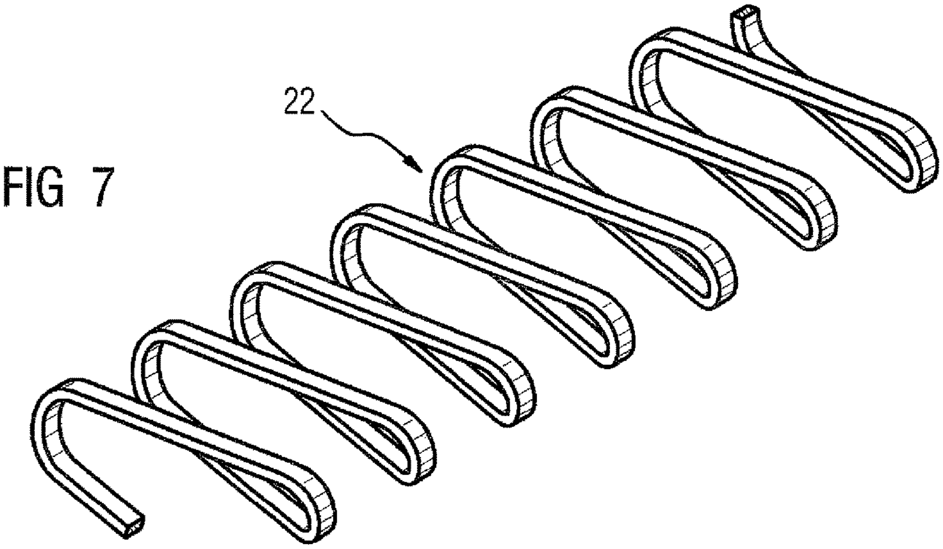
FIG. 7 shows a spiral, which is part of the second embodiment as shown in FIG. 5 and FIG. 6.

FIG. 5 and FIG. 6 show a second embodiment of a gas diffusion layer 8 having a further spring component 12*b*. Here, the spring component 12*b* comprises a spiral mesh. The spiral mesh comprises cross-bars 20, which are arranged in succession and around which there are wound a plurality of spirals 22. FIG. 7 moreover shows an individual spiral 22, which forms the basis for the spring action of the mesh. The spiral mesh 12*b* is formed when spirals 22 with the same geometry but with a different winding direction are pushed alternately into one another and connected by the cross-bars 20. The cross-bars 20 are manufactured from plastic, for example. The spirals 22 are made of an electrically conductive material such as, e.g., high-grade steel, titanium, niobium, tantalum or nickel.

FIG. 5 moreover shows a top layer 24, which takes on the function of a contacting component 19 of the gas diffusion layer 8. In this case, the top layer 24 is formed from a layering of expanded metal or of other porous and mechanically stable materials. Also conceivable, for example, are a non-woven material on a woven wire fabric, metal foam or a sintered metal disk.

Figure 8:
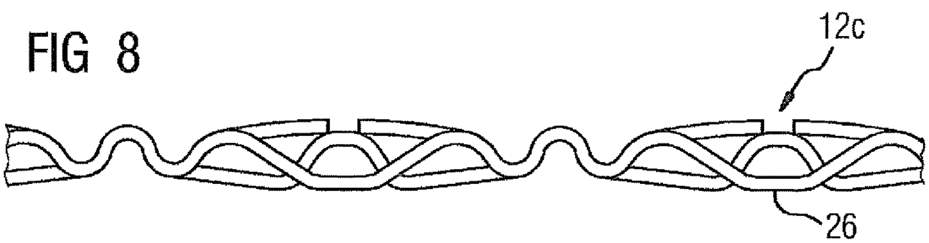
FIG. 8 shows a side view of a third embodiment of a spring component of a gas diffusion layer.
Figure 9:
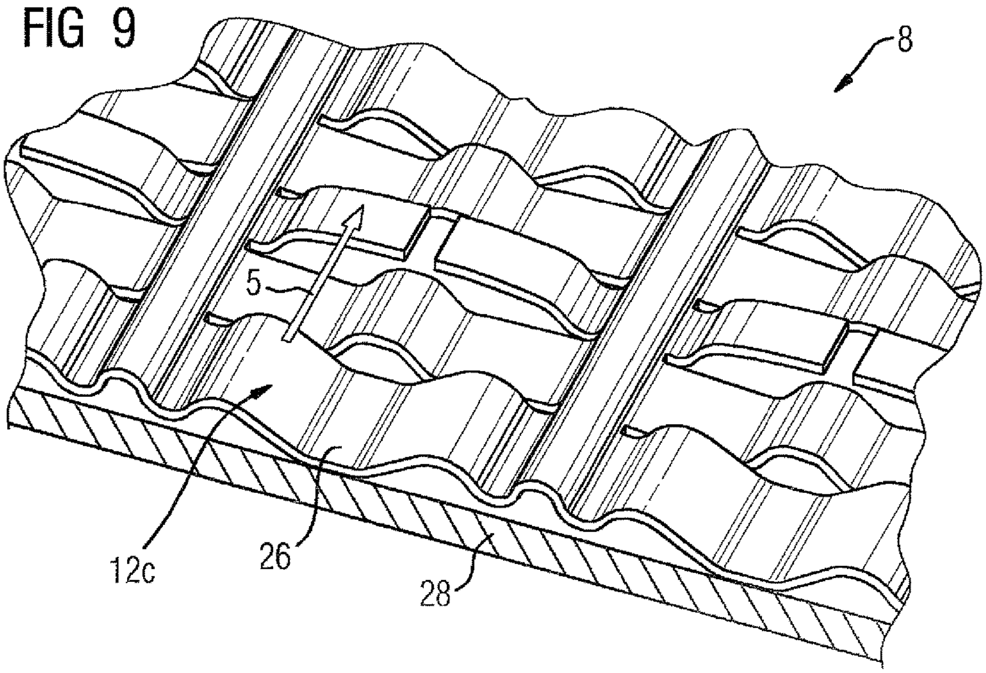
FIG. 9 shows a perspective illustration of the third embodiment of a spring component of a gas diffusion layer.

FIG. 8 and FIG. 9 show a third embodiment of the gas diffusion layer 8 having a third spring component 12*c*. In this case, the spring component 12*c* is configured in the manner of a corrugated metal sheet with an alternately opposing corrugation. This shape has the significant advantage that the flow is simultaneously guided in the indicated direction S. The resilience is provided here in three stages progressively rising from a very soft spring to a stop-like behavior (see FIG. 2). In FIG. 8 and FIG. 9, the reference sign 26 denotes locations which are fixed points on an expanded metal. The hatched area 28 in FIG. 9 represents a top layer 24 or contacting component 19 which is directed toward one of the electrodes 6*a*, 6*b*.

The embodiment of the spring component 12*c* which is shown in FIG. 8 and FIG. 9 has a substantially two-dimensional form. A plurality of elastic portions of the spring component 12*c* are arranged at different intervals with respect to a lateral direction running substantially perpendicular to the two-dimensional extent (FIG. 8), in order to provide the progressive spring characteristic curve. This has the effect that only a few outer portions of the spring component 12*c* are deformed in the case of small deviations. In the case of relatively large deviations, both the deformation and the number of deformed portions of the spring component 12*c* increase, resulting in a non-linear rise in the force required for the deformation, and consequently a progressive spring characteristic curve.

All of the above-described spring components 12*a*, 12*b*, 12*c* or gas diffusion layers 8 have the property that they compensate for component tolerances which arise in the electrolyzer, in order to allow for uniform contacting of the membrane-electrode-assembly in every instance of tolerance. On account of the progressive spring characteristic curve of the spring components 12*a*, 12*b*, 12*c*, excessive deformation of the gas diffusion layer 8 on one side is prevented in the case of overloading. In all of the embodiments, it is moreover conceivable to arrange a porous diffusion component (not shown in more detail here) between the spring component 12*a*, 12*b*, 12*c* and the contacting component 19, 24, 28.

What is claimed is:

1. A gas diffusion layer arranged between a bipolar plate and an electrode of an electrochemical cell, said gas diffusion layer comprising:

at least two separate layers formed as elements which are separate from each other, with one of the separate layers being layered on top of another one of the separate layers; and a spring component forming at least one of the at least two separate layers, said spring component having a progressive spring characteristic curve selected so as to achieve a deformation in a range of a normal contact pressure of 5-25 bars.

2. The gas diffusion layer of claim 1, wherein the gas diffusion layer has at least three separate layers formed as elements which are separate from each other and being layered on top of each other, said spring component forming an outer separate layer of the gas diffusion layer.

3. The gas diffusion layer of claim 1, wherein the at least two separate layers have different structure and/or composition.

4. The gas diffusion layer of claim 1, wherein the gas diffusion layer has at three layers, a first one of the layers configured as a contacting component, a second one of the layers configured as a diffusion component, and a third one of the layers configured as the spring component.

5. The gas diffusion layer of claim 1, wherein the spring characteristic curve of the spring component is divided into at least two regions of differing progression.

6. The gas diffusion layer of claim 1, wherein the spring characteristic curve of the spring component is divided into at least three regions of differing progression.

7. The gas diffusion layer of claim 1, wherein the spring component is deformed up to 60% of a maximum elastic deformation when a contact pressure of up to 5 bar is applied.

8. The gas diffusion layer of claim 1, wherein the spring component is deformed up to 80% of a maximum elastic deformation when a contact pressure of up to 5 bar is applied.

9. The gas diffusion layer of claim 1, wherein the spring component is deformed between 60% to 90% of a maximum elastic deformation when a contact pressure between 5 bar and 25 bar is applied.

10. The gas diffusion layer of claim 1, wherein the spring component is formed from an electrically conductive material.

11. The gas diffusion layer of claim 10, wherein the electrically conductive material is selected from the group consisting of steel, titanium, niobium, tantalum, nickel, and any combination thereof.

12. The gas diffusion layer of claim 1, wherein the spring component is formed as a profiled metal sheet.

13. The gas diffusion layer of claim 1, wherein the spring component is formed as a mesh.

14. The gas diffusion layer of claim 1, wherein the spring component comprises one or more spirals.

15. An electrochemical cell, comprising:

a bipolar plate;

an electrode; and a gas diffusion layer arranged between the bipolar plate and the electrode, said gas diffusion layer including at least two separate layers formed as elements which are separate from each other, with one of the layers being layered on top of another one of the layers, and a spring component forming at least one of the at least two separate layers, said spring component having a progressive spring characteristic curve selected so as to achieve a deformation in a range of a normal contact pressure of 5-25 bars.

16. The electrochemical cell of claim 14 constructed as a PEM electrolysis cell or a galvanic cell.

17. An electrolyzer, comprising a PEM electrolysis cell which includes a bipolar plate, an electrode, and a gas diffusion layer arranged between the bipolar plate and the electrode, said gas diffusion layer including at least two separate layers formed as elements which are separate from each other, with one of the layers being layered on top of another one of the layers, and a spring component forming at least one of the at least two layers, said spring component having a progressive spring characteristic curve selected so as to achieve a deformation in a range of a normal contact pressure of 5-25 bars.

* * * * *